US012791297B2

(12) United States Patent
Golden et al.

(10) Patent No.: US 12,791,297 B2
(45) **Date of Patent: *Nov. 10, 2026**

(54) DEVICE FOR IDENTIFYING CENTER OF STRIKING FACE OF A WOOD-TYPE GOLF CLUB HEAD

(71) Applicant: Acushnet Company, Fairhaven, MA (US)

(72) Inventors: Charles E. Golden, Encinitas, CA (US); Scott A. Knutson, Escondido, CA (US); Joseph John Van Wezenbeeck, Oceanside, CA (US)

(73) Assignee: Acushnet Company, Fairhaven, MA (US)

( * ) Notice: Subject to any disclaimer, the term of this patent is extended or adjusted under 35 U.S.C. 154(b) by 546 days.

This patent is subject to a terminal disclaimer.

(21) Appl. No.: 18/349,138

(22) Filed: Jul. 8, 2023

(65) Prior Publication Data

US 2023/0349682 A1 Nov. 2, 2023

Related U.S. Application Data

(63) Continuation of application No. 17/228,223, filed on Apr. 12, 2021, now Pat. No. 11,725,921.

(60) Provisional application No. 63/034,241, filed on Jun. 3, 2020.

(51) Int. Cl.
*G01B 5/00* (2006.01)
*G01B 3/20* (2006.01)

(52) U.S. Cl.
CPC ............. *G01B 5/0023* (2013.01); *G01B 3/20* (2013.01)

(58) Field of Classification Search
CPC ................................ G01B 5/0023; G01B 3/20
See application file for complete search history.

(56) References Cited

U.S. PATENT DOCUMENTS

| | | | | |
|---|---|---|---|---|
| 2,546,426 | A | 3/1951 | Bryant | |
| 2,973,581 | A | 3/1961 | Rhodehamel | |
| 3,822,477 | A | 7/1974 | Collins | |
| 4,094,072 | A | 6/1978 | Erb | |
| 4,245,391 | A * | 1/1981 | Heller | A63B 53/0466 33/508 |
| 4,245,392 | A | 1/1981 | Heller | |
| 4,622,836 | A | 11/1986 | Long et al. | |
| 4,640,017 | A | 2/1987 | Cukon | |
| 4,858,332 | A | 8/1989 | Thomas | |

(Continued)

*Primary Examiner* — Kristina M Deherrera
*Assistant Examiner* — Tania Courson
(74) *Attorney, Agent, or Firm* — Mike S. Kim

(57) ABSTRACT

A device and method for identifying a center of a striking face of a golf club head are disclosed. The center determining device includes a device body having a central opening defined through a first surface of said device body and a second surface opposite said first surface. A first dimension indicator including a pair of first indicator jaws and a second dimension indicator including a pair of second indicator jaws may be disposed on said device body. A first adjuster and a second adjuster are operable to adjust said first separation distance said pair of first indicator jaws and a second separation distance between said second indicator jaws. When the pair of first indicator jaws and the pair of second indicator jaws are equally spaced around the heel, toe, topline, and sole edges of the striking face, the central opening is aligned with the center of the striking face.

10 Claims, 14 Drawing Sheets

(56) References Cited

U.S. PATENT DOCUMENTS

| | | | | |
|---|---|---|---|---|
| 4,875,293 | A | 10/1989 | Wakefield | |
| 4,899,430 | A | 2/1990 | Farino | |
| 5,327,766 | A | 7/1994 | Humphreys | |
| 5,421,098 | A | 6/1995 | Muldoon | |
| 5,540,090 | A | 7/1996 | Wheatley | |
| 5,884,409 | A | 3/1999 | Muldoon | |
| 6,363,620 | B1 | 4/2002 | Goodjohn | |
| 6,430,829 | B1 * | 8/2002 | Williamson | A63B 60/00 33/534 |
| 6,449,860 | B1 | 9/2002 | Nakai | |
| 6,508,007 | B1 | 1/2003 | Mitchell | |
| 6,871,414 | B2 | 3/2005 | Burney et al. | |
| 6,895,680 | B2 * | 5/2005 | Spencer | A63B 53/10 33/508 |
| 7,164,473 | B2 | 1/2007 | Goodjohn | |
| 7,403,277 | B2 * | 7/2008 | Goodjohn | G01B 5/0023 473/282 |
| 8,430,764 | B2 | 4/2013 | Bennett et al. | |
| 8,777,771 | B2 | 7/2014 | Bennett et al. | |
| 8,821,307 | B2 | 9/2014 | Park et al. | |
| 9,163,919 | B2 * | 10/2015 | Holtzman | A63B 53/02 |
| 11,725,921 | B2 * | 8/2023 | Golden | G01B 5/0023 33/508 |
| 2003/0022727 | A1 | 1/2003 | Spencer | |
| 2004/0221464 | A1 | 11/2004 | Burney | |
| 2014/0206475 | A1 | 7/2014 | Brunski et al. | |
| 2014/0352162 | A1 | 12/2014 | Holtzman | |

* cited by examiner

DEVICE FOR IDENTIFYING CENTER OF STRIKING FACE OF A WOOD-TYPE GOLF CLUB HEAD

The present application is a continuation of U.S. application Ser. No. 17/228,223, filed on Apr. 12, 2021, which claims the benefit of and priority to U.S. Provisional Application No. 63/034,241, filed on Jun. 3, 2020, the disclosures of which are incorporated by reference in their entirety.

FIELD OF THE INVENTION

The present invention relates generally to a device and method for locating the center of a striking face of a golf club head, and more particularly, to a device and method for locating the center of a striking face of a wood-type golf club head.

BACKGROUND

Whether using, designing, or building a golf club, it is critically important to be able to consistently identify the center of the striking face. Everyone knows that you can hit a golf ball the furthest when you hit it with the center of the striking face. When designing golf clubs, it is critically important to know where the center of the striking face is because many of the rules of golf relating to the conformance of a golf club head are based on measurements taking place at the center of the striking face. When building golf clubs, it is important to know where the center of the striking face is because it dictates how you manipulate the center of gravity of the golf club head to modify ball flight and golf club performance.

However, it can be difficult to accurately determine the center of the striking face for several reasons. First, neither golf clubs nor their striking faces have regular shapes. Therefore, it is not as simple as connecting vertices to determine the center of a polygon. Second, many golf clubs, in particular wood-type golf clubs, do not have planar faces. Such faces have roll, or curvature from top to bottom, and bulge, or curvature from heel to toe.

FIG. 1 shows a wood-type golf club head 300 that includes a striking face 301 and a body 302. The striking face 301 includes a heel edge 303, a toe edge 304 opposite the heel edge 303, a sole edge 305, and a topline edge 306 opposite the sole edge 305.

FIG. 1 also shows a conventional template 100 for determining the center of a striking face 301. Template 100 includes a center opening 101, a horizontal axis 102, and a vertical axis 104 that intersects the horizontal axis 102 at the center opening 101. The template 100 is transparent so that the striking face 301 is visible through the template 100. The template 100 is then positioned over the striking face 301 such that the center opening 101 is both equidistant between the heel edge 303 of the striking face 301 and the toe edge 304 of the striking face 301 and equidistant between the topline edge 306 of the striking face 301 and the sole edge 305 of the striking face 301 as shown in FIG. 1.

What is needed is a device and a method for identifying the center of a striking face of a wood-type golf club that is more accurate, more repeatable, and faster than the conventional template 100.

SUMMARY OF THE INVENTION

The systems, methods, and devices described herein have innovative aspects, no single one of which is indispensable or solely responsible for their desirable attributes. Without limiting the scope of the claims, some of the advantageous features will now be summarized. According to an exemplary embodiment of the present invention, a center determining device for identifying a center of a striking face of a golf club head includes a body having first surface and second surface opposite said first surface, where said body may be at least partially transparent; a central opening defined through said first surface and said second surface; a first elongate channel extending in a first direction adjacent an edge of said body and defined through said first surface of said body; a first dimension indicator positioned along said first elongate channel, said first dimension indicator comprising: a first centering mechanism attached to said first surface of said body proximate said first elongate channel and spaced apart from said central opening along a second direction substantially orthogonal to said first direction, said first centering mechanism having a first through-hole defined therethrough that is substantially parallel to said first elongate channel, where a width of said first through-hole is greater in a central portion of said first through-hole than at ends of said first through-hole; a pair of first indicator bodies disposed at least partially within said first elongate channel, each of said pair of first indicator bodies having a threaded opening defined therein extending in said first direction; a pair of first indicator jaws attached to said pair of first indicator bodies and extending along said first surface of said body in said second direction at least as far as said central opening, where said pair of first indicator jaws are spaced apart by a first separation distance such that said central opening is located at a midpoint of said first separation distance; and a first threaded adjuster mated with said threaded openings of said pair of first indicator bodies and passing through said first through-hole defined in said first centering mechanism, where said first threaded adjuster comprises a first end having first threads, a second end opposite said first end having second threads which are opposite said first threads, and a central portion between said first end and said second end having a width greater than said width of said first through-hole at said ends of said first through-hole and less than said width of said central portion of said first through-hole, where said first threaded adjuster is configured to adjustably increase and decrease said first separation distance between said pair of first indicator jaws while maintaining equidistance between said pair of first indicator jaws and said central opening; a second elongate channel extending in said second direction adjacent said central opening and defined through said first surface of said body and said second surface of said body; a second dimension indicator positioned along said second elongate channel, said second dimension indicator comprising: a second centering mechanism attached to said second surface of said body proximate said second elongate channel and spaced apart from said central opening along said first direction, said second centering mechanism having a second through-hole defined therethrough that is substantially parallel to said second elongate channel, where a width of said second through-hole is greater in a central portion of said second through-hole than at ends of said second through-hole; a pair of second indicator bodies disposed at least partially within said second elongate channel, each of said pair of second indicator bodies having a threaded opening defined therein extending in said second direction; a pair of second indicator jaws attached to said pair of second indicator bodies and extending along said first surface of said body in said first direction at least as far as said central opening, where said pair of second indicator jaws are spaced apart by a second separation distance such that said central opening is located at a midpoint of said second separation distance; and a second threaded adjuster mated with said threaded openings of said pair of second indicator bodies and passing through said second through-hole defined in said second centering mechanism, where said second threaded adjuster comprises a first end having first threads, a second end opposite said first end having second threads which are opposite said first threads, and a central portion between said first end and said second end having a width greater than said width of said second through-hole at said ends of said second through-hole and less than said width of said second through-hole at said central portion of said second through-hole, and where said second threaded adjuster is configured to increase and decrease said second separation distance between said pair of second indicator jaws while maintaining equidistance between said pair of second indicator jaws and said central opening, where said device is adapted to engage said striking face, aligning said central opening with said center of said striking face when said pair of first indicator jaws are aligned with a heel edge and a toe edge of said striking face and said pair of second indicator jaws are aligned with a topline edge and a sole edge of said striking face.

According to another exemplary embodiment of the present invention a center determining device for identifying a center of a striking face of a golf club head may include a device body, where said body is at least partially transparent; a central opening defined through a first surface of said device body and a second surface opposite said first surface; a first dimension indicator disposed along said first surface of said device body, where said first dimension indicator includes a pair of second indicator jaws that are spaced apart by a first separation distance and are equally spaced from said central opening along a first direction; a first adjuster operable to adjust said first separation distance between said pair of first of indicator jaws; a second dimension indicator disposed along said first surface of said device body, where said second dimension indicator includes a pair of second indicator jaws that are spaced apart by a second separation distance and are equally spaced from said central opening along a second direction orthogonal to said first direction; and a second adjuster operable to adjust the second separation distance between said pair of second indicator jaws, where said device is adapted to engage said striking face, aligning said central opening with said center of said striking face when said pair of first indicator jaws are aligned with a heel edge and a toe edge of said striking face and said pair of second indicator jaws are aligned with a topline edge and a sole edge of said striking face.

According to another exemplary embodiment of the present invention, a method of identifying a center of a striking face of a wood-type golf club head may include positioning said wood-type golf club head on a center determining device, adjusting a first separation distance between a pair of first indicator jaws until said pair of first indicator jaws intersect a heel edge of said striking face and a toe edge of said striking face; adjusting a second separation distance between a pair of second indicator jaws until said pair of second indicator jaws intersect a topline edge of said striking face and a sole edge of said striking face; re-adjusting said first separation distance and said second separation distance until said pair of first indicator jaws intersect said heel edge and said toe edge while said pair of second indicator jaws simultaneously intersect said topline edge and said sole edge; and marking a center location on said striking face.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

Figure 1:
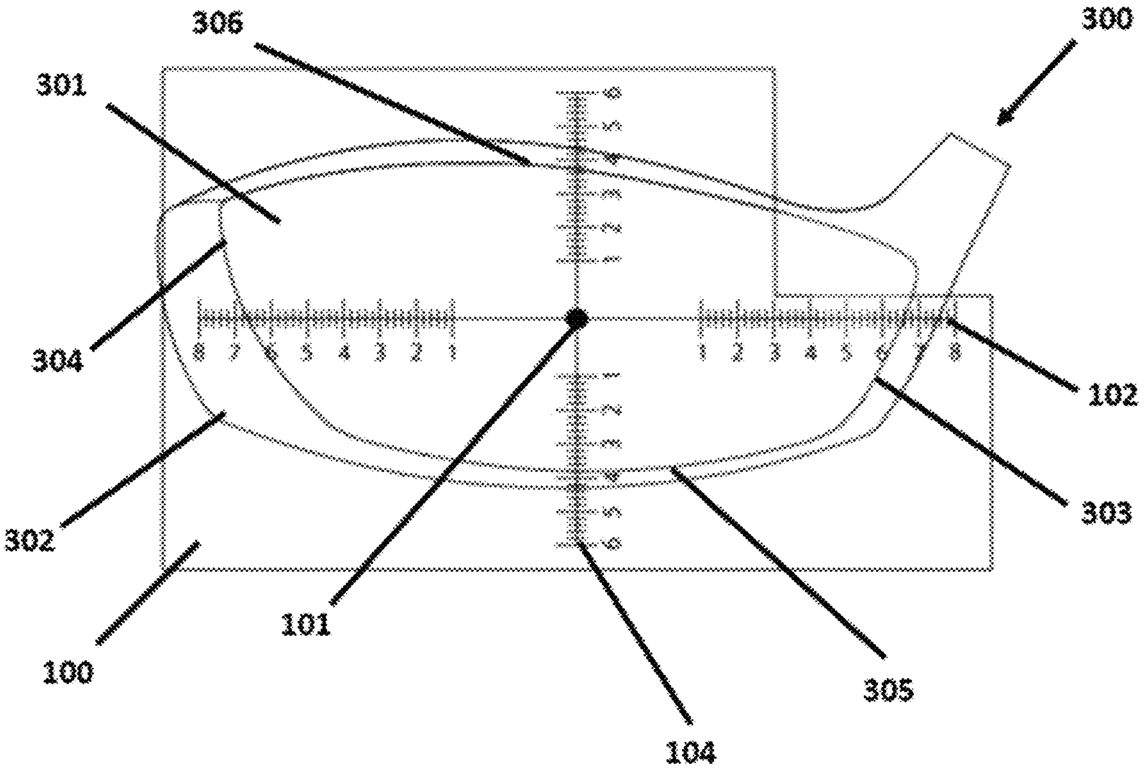
FIG. 1 (Prior Art)
FIG. 1 shows a prior art template for identifying the center of a striking face in accordance with the prior art.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further and further modifications of inventive features illustrated herein, and additional applications of the principles of the inventions as illustrated herein, which would occur to one skilled in the relevant art and having possession of this disclosure, are to be considered within the scope of the invention.

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

In describing the present technology, the following terminology may have been used: The singular forms "a," "an," and "the" include plural referents unless the context clearly dictates otherwise. Thus, for example, reference to an item includes reference to one or more items. The term "plurality" refers to two or more of an item. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. A plurality of items may be presented in a common list for convenience. However, these lists should be construed as though each member of the list is individually identified as a separate and unique member. Thus, no individual member of such list should be construed as a de facto equivalent of any other member of the same lists solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to a selection of one of two or more alternatives, and is not intended to limit the selection of only those listed alternative or to only one of the listed alternatives at a time, unless the context clearly indicated otherwise.

Features of the present disclosure will become more fully apparent from the following description and appended claims, taken in conjunction with the accompanying drawings. After considering this discussion, and particularly after reading the section entitled "Detailed Description" one will understand how the illustrated features serve to explain certain principles of the present disclosure.

Embodiments described herein generally relate to center determining devices. More specifically, some embodiments relate to center determining devices for determining the center of a striking face of a wood-type golf club head.

In describing the present technology herein, certain features that are described in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure as well as the principle and novel features disclosed herein.

FIGS. 2-10 show a center determining device 200 for identifying the center of a striking face of a golf club head in accordance with an embodiment of the present invention.

Figure 2:
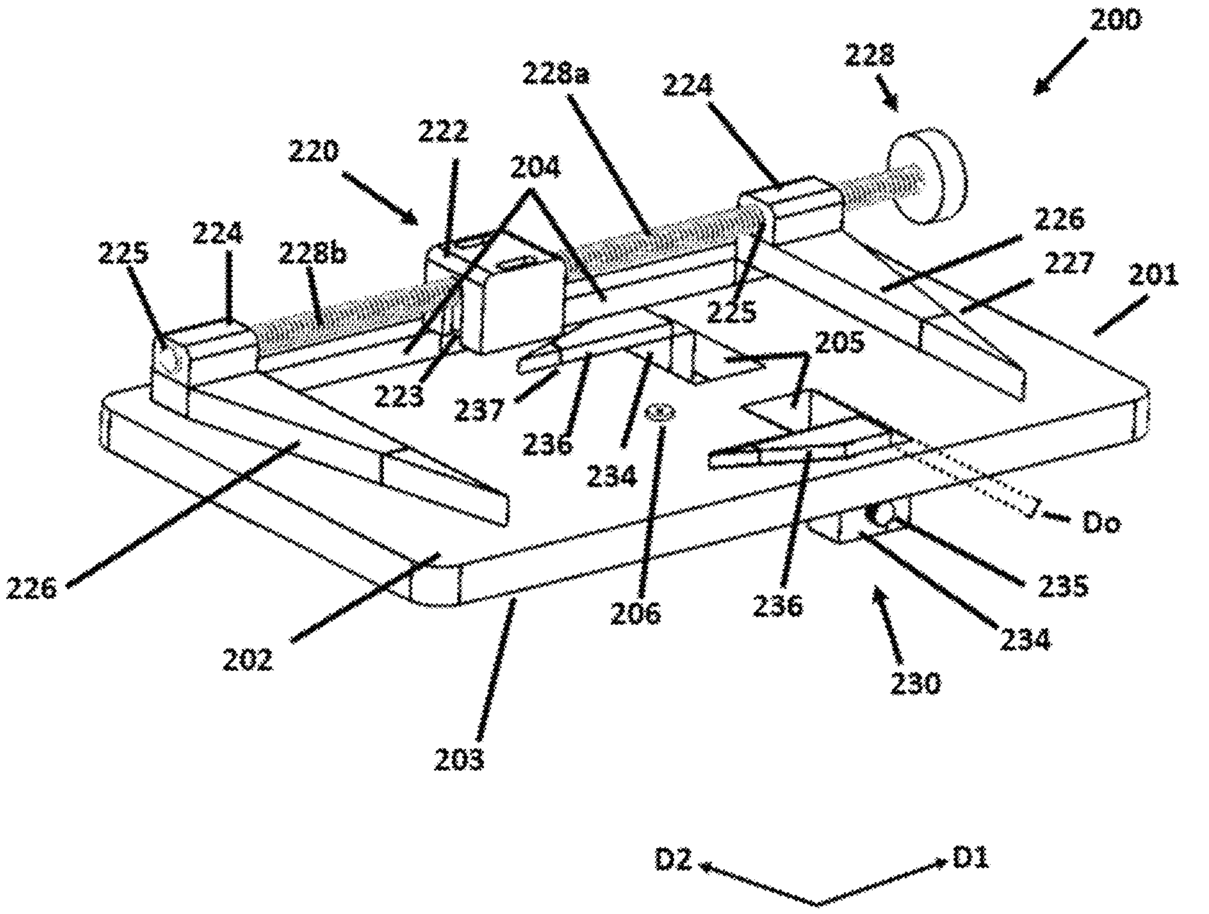
FIG. 2 shows a perspective view of a center determining device in accordance with an embodiment of the present invention.

FIG. 2 is a perspective view of the center determining device 200. Center determining device 200 includes a device body 201, a first dimension indicator 220, and a second dimension indicator 230 (partially obscured).

The device body 201 includes a first surface 202 and a second surface 203 opposite the first surface 202. A central opening 206 is defined through the first surface 202 and the second surface 203. The central opening 206 need not be located precisely in the center of the device body 201, but it is preferable that the central opening 206 be located nearer the center of the device body 201 than any edge of the device body 201 to reduce the footprint of the center determining device 200. The device body 201 may be formed out of any number of materials, but preferably the device body 201 is formed of a material that is at least partially transparent or translucent such as glass or a polymeric material such as acrylic (polymethylmethacrylate), butyrate (cellulose acetate butyrate), lexan (polycarbonate), PETG (glycol modified polyethylene terephthalate), or other transparent or translucent polymeric material. For clarity the device body 201 is depicted as being opaque unless otherwise noted. While the central opening 206 is depicted as a circular opening, it is within the scope of the present invention for the central opening 206 to have any number of shapes including a line or a series of lines. For example, according to embodiments of the present invention, the central opening 206 may be defined in the shape of a cross, an "x", or a star.

Figure 3:
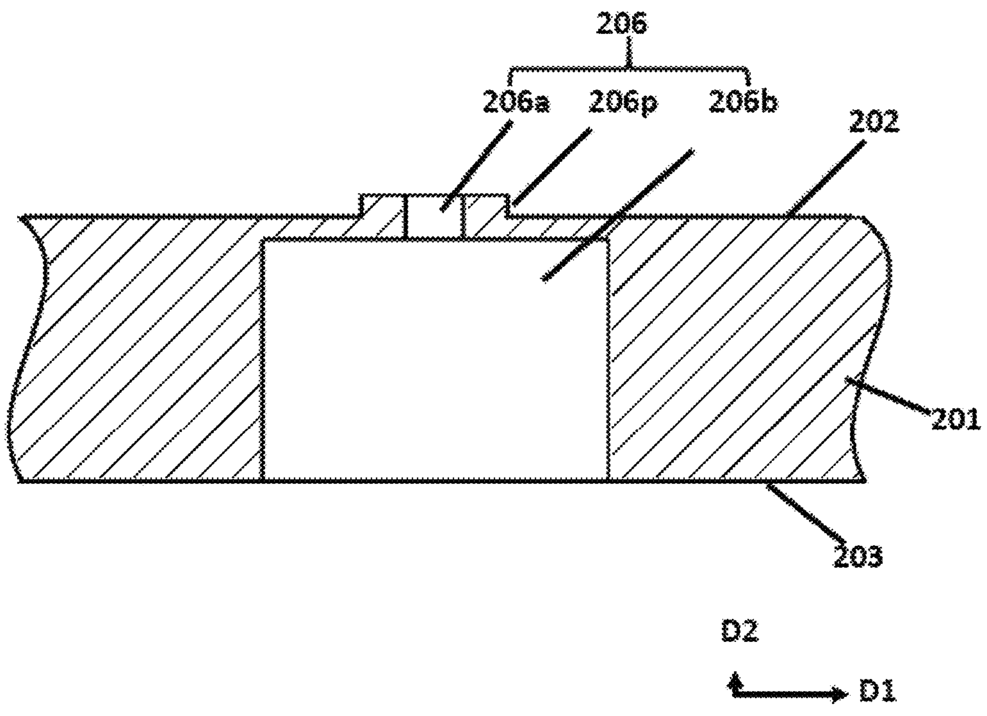
FIG. 3 is a sectional view of the central opening of the center determining device in accordance with an embodiment of the present invention.

Referring to FIG. 3, a sectional view of the device body 201 is provided proximate the central opening 206 along the first direction D1. According to an exemplary embodiment, a portion of the central opening 206 may project above the first surface 202 of the device body 201 as described below. The central opening 206 may include a narrow opening 206*a*, a wide opening 206*b*, and a projection 206*p*. The wide opening 206*b* is defined partially through the device body 201 through the second surface 203. The narrow opening 206*a* is defined through the device body 201 through the first surface 202. The narrow opening 206*a* and the wide opening 206*b* are aligned such that the central opening 206 passes entirely through the device body 201. The central opening 206 is configured in this way to accommodate a marker (not shown). The marker may be inserted through the wide opening 206*b* so that only the tip of the marker passes through the narrow opening 206*a*. The marker is discussed in greater detail below. Preferably, a height of the projection 206*p* is less than a height of the pair of first indicator jaws 226 or a height of the pair of second indicator jaws 236.

Referring back to FIG. 2, a first elongate channel 204 is defined in the device body 201 through the first surface 202 and extends generally in a first direction D1. The first elongate channel 204 is separated from the central opening 206 along a second direction D2 that is substantially orthogonal to the first direction D1. The first elongate channel 204 may include a single channel, or alternatively may include two or more separate channels that are separated by a portion of the device body 201 as shown in FIG. 2. The first elongate channel 204 may be defined through a partial thickness of the device body 201, or alternatively may be formed through the entire thickness of the device body 201 through both the first surface 202 and the second surface 203 as shown in present embodiment.

A second elongate channel 205 is defined in the first surface 202 and extends generally in a second direction D2 orthogonal to the first direction D1. The second elongate channel 205 may include a single channel, or alternatively may include two or more separate channels that are separated by a portion of the device body 201 as shown in FIG. 2. The second elongate channel 205 may be defined through a partial thickness of the device body 201, or alternatively may be formed through the entire thickness of the device body 201 through both the first surface 202 and the second surface 203 as shown in the present embodiment.

The first dimension indicator 220 may include a first centering mechanism 222, a pair of first indicator bodies 224, a pair of first indicator jaws 226, and a first adjuster 228. In the present embodiment, the first adjuster 228 is depicted as a tie rod mechanism; however, it is within the scope of the present invention for the first adjuster 228 to consist of a geared mechanism such as dual rack and pinion mechanism, a cog belt twisted over itself, a pulley mechanism with or without a tensioning spring, a turnbuckle mechanism, or any mechanism that allows for the pair of first indicator jaws 226 to open and close while remaining equidistant from the central opening 206.

The first centering mechanism 222 may be formed at any position along the first elongate channel 204, but preferably the first centering mechanism 222 is positioned so as to span over the first elongate channel 204 or on a portion of the device body 201 that separates the two or more separate channels that define the first elongate channel 204. The first centering mechanism 222 may be attached to the device body 201 by any number of known methods, for example, by an adhesive, a mechanical fastener, plastic welding, or a friction fit. In the current exemplary embodiment, the device body 201 includes one or more protrusions that extend into corresponding receptacles defined in the first centering mechanism 222. A first through-hole 223 is defined in the first centering mechanism 222. The first through-hole 223 extends through the first centering mechanism 222 in the first direction D1 and has a width that is at least as great as that of a portion of the first adjuster 228 that passes therethrough. The first through-hole 223 and the first adjuster 228 are described in greater detail below.

The pair of first indicator bodies 224 are disposed at least partially within the first elongate channel 204 and are spaced apart from the central opening 206 equally along the first direction D1. Each of the pair of first indicator bodies 224 has a shape that corresponds to that of the first elongate channel 204 such that the pair of first indicator bodies 224 may move in the first direction D1 within the first elongate channel 204 but may not move in the second direction D2. Each of the pair of first indicator bodies 224 includes a first threaded opening 225 defined therethrough in the first direction D1 and aligned with the first through-hole 223.

The pair of first indicator jaws 226 are disposed on or over the first surface 202 and extend from the pair of first indicator bodies 224 in the second direction D2 at least as far as the central opening 206. The pair of first indicator jaws 226 may include a first center indicator 227 at a location corresponding to a projection of the central opening 206 along the first direction D1. The first center indicator 227 may be a visual indicator such as a line, a dot, a protrusion, or a recess.

The pair of first indicator jaws 226 may be monolithically formed with the pair of first indicator bodies 224. Alternatively, the pair of first indicator jaws 226 may be formed independently of the pair of first indicator bodies 224 and attached via adhesive, mechanical fastening, friction fit, or plastic welding. It is also within the scope of the present invention for the pair of first indicator bodies 224 to include multiple layers and for the pair of first indicator jaws 226 to be sandwiched therebetween.

According to an embodiment of the present invention, the first adjuster 228 may include a first end 228*a*, a second end 228*b* opposite the first end 228*a*, and a central portion 228*c* therebetween (see FIG. 6 below). The central portion 228*c* is positioned within the first through-hole 223 of the first centering mechanism 222. Threads are defined in the first end 228*a* and opposite threads are defined in the second end 228*b*. For example, in a case where the first end 228*a* includes right-handed threads the second end 228*b* includes left-handed threads. The first threaded openings 225 defined in the pair of first indicator bodies 224 include corresponding threads so that when the first adjuster 228 is rotated about a first axis of rotation, the pair of first indicator bodies 224 are forced to translate in opposite directions along a first axis of translation extending in the first direction D1. As noted above, in alternative embodiments, the first adjuster 228 may be implemented as geared mechanism such as dual rack and pinion mechanism, a cog belt twisted over itself, a pulley mechanism with or without a tensioning spring, a turnbuckle mechanism, or any mechanism that allows for a first separation distance between the pair of first indicator jaws 226 to be adjusted while maintaining equidistance between the pair of first indicator jaws 226 from the central opening 206.

Figure 4:
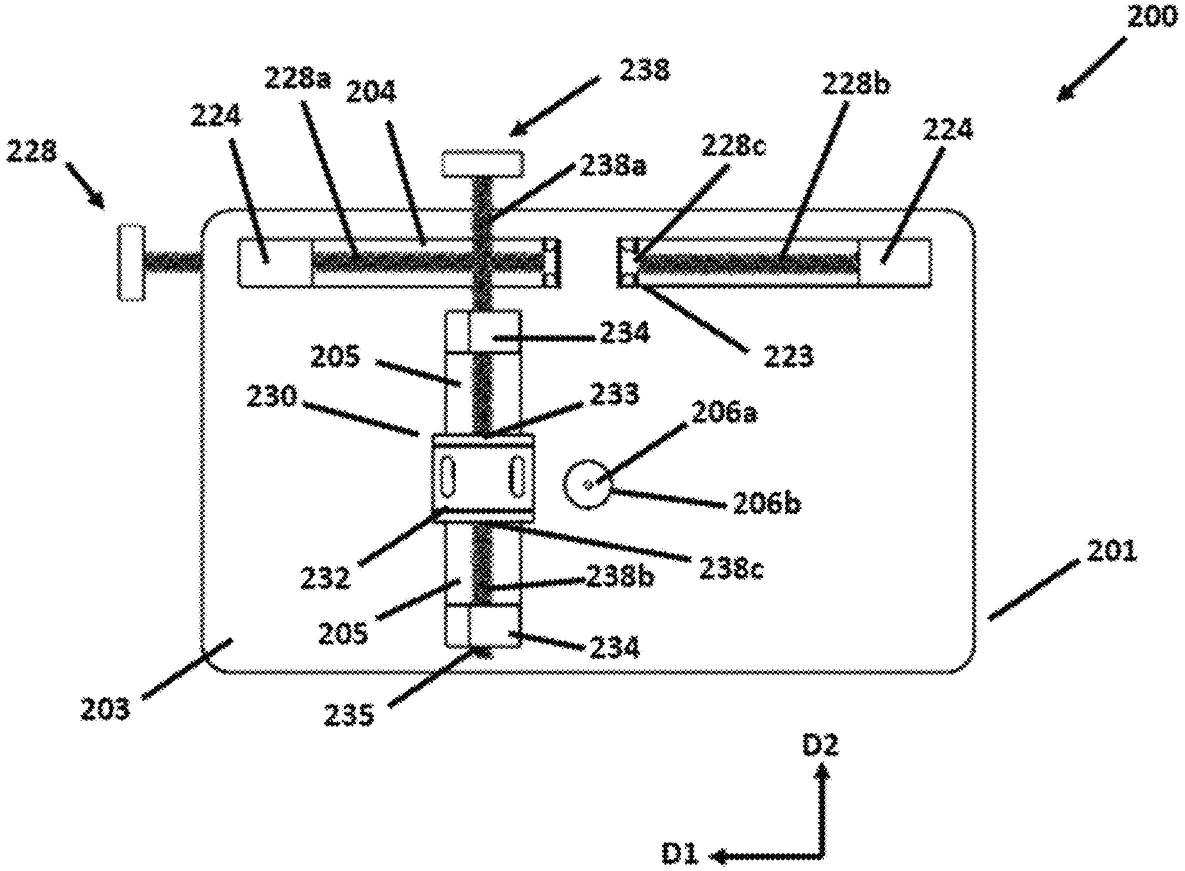
FIG. 4 shows a plan view of a center determining device in accordance with an embodiment of the present invention.

Some elements of the second dimension indicator 230 are shown in FIG. 2, while some elements are at least partially obscured by the device body 201. Therefore, both FIGS. 2 and 4 are referenced below in describing the second dimension indicator 230.

The second dimension indicator 230 may include a second centering mechanism 232, a pair of second indicator bodies 234, a pair of second indicator jaws 236, and a second adjuster 238. In the present embodiment, the second adjuster 238 is depicted as a tie rod mechanism; however, it is within the scope of the present invention for the second adjuster 238 to consist of a geared mechanism such as dual rack and pinion mechanism, or a cog belt twisted over itself, a pulley mechanism with or without a tensioning spring, a turnbuckle mechanism or any mechanism that allows for the pair of second indicator jaws 236 to open and close while remaining equidistant from the central opening 206.

The second centering mechanism 232 may be disposed on the second surface 203 of the device body 201 at any point along the second elongate channel 205, but preferably the second centering mechanism 232 is positioned so as to span over the second elongate channel 205 or on the portion of the device body 201 that separates the two or more separate channels that define the second elongate channel 205. The second centering mechanism 232 may be attached to the device body 201 by any number of known methods, for example, by an adhesive, a mechanical fastener, or a friction fit. According to an exemplary embodiment shown in FIGS. 2 and 4, the device body 201 may include one or more protrusions that extend into corresponding receptacles defined in the second centering mechanism 232. The second through-hole 233 extends through the second centering mechanism 232 in the second direction D2 and has a width that is at least as great as that of a portion of the second adjuster 238 that passes therethrough. The second through-hole 233 and the second adjuster 238 are described in greater detail below.

The pair of second indicator bodies 234 are disposed within the second elongate channel 205 such that the pair of second indicator bodies 234 may move in the second direction D2 within the second elongate channel 205 but may not move in the first direction D1. Each of the pair of second indicator bodies 234 includes a second threaded opening 235 defined therethrough in the second direction D2 and aligned with the second through-hole 233.

The pair of second indicator jaws 236 are disposed on or over the first surface 202 and extend from the pair of second indicator bodies 234 in the first direction D1 at least as far as the central opening 206. The pair of second indicator jaws 236 may include a second center indicator 237 at a location corresponding to a projection of the central opening 206 along the second direction D2. The second center indicator 237 may be a visual indicator such as a line, a dot, a protrusion, or a recess.

The pair of second indicator jaws 236 may be monolithically formed with the pair of second indicator bodies 234. Alternatively, the pair of second indicator jaws 236 may be formed independently of the pair of second indicator bodies 234 and attached via adhesive, mechanical fastening, friction fit, or plastic welding. It is also within the scope of the present invention for the pair of second indicator bodies 234 to include multiple layers and for the pair of second indicator jaws 236 to be sandwiched therebetween. As shown in FIG. 2, the pair of second indicator jaws 236 may be offset by an offset distance Do from an edge of the pair of second indicator bodies 234. The offset distance Do increases the range of motion of the pair of first indicator jaws 226 while reducing the footprint of the center determining device 200.

Figure 6:
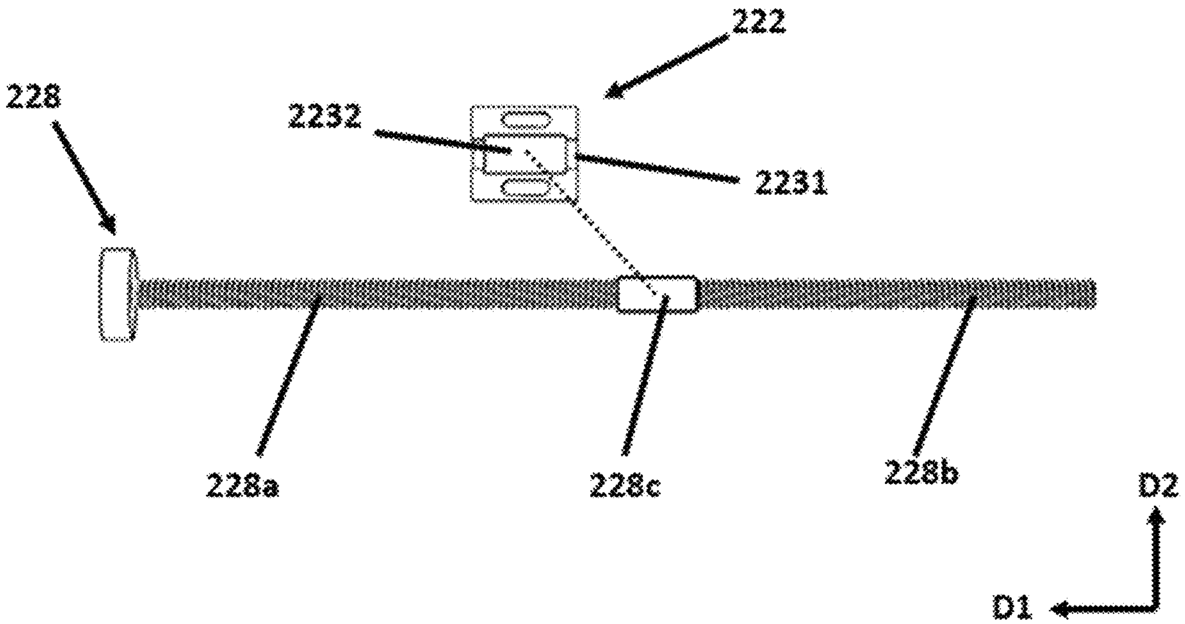
FIG. 6 shows an exploded view of an adjuster and a centering mechanism in accordance with an embodiment of the present invention.

As shown in FIG. 4, the second adjuster 238 may include a first end 238*a*, a second end 238*b* opposite the first end 238*a*, and a central portion 238*c* therebetween (the central portion 238*c* is obscured, see FIG. 6 for a depiction of the central portion 228*c* of the first adjuster 228). The central portion 238*c* is located within the second through-hole 233 of the second centering mechanism 232. Threads are defined in the first end 238*a* and opposite threads are defined in the second end 238*b*. For example, in a case where the first end 238*a* includes right-handed threads the second end 238*b* includes left-handed threads. The second threaded openings 235 defined in the pair of second indicator bodies 234 include corresponding threads so that when the second adjuster 238 is rotated about a second axis of rotation, the pair of second indicator bodies 234 are forced to translate in opposite directions along a second axis of translation corresponding second direction D2. As noted above, in alternative embodiments, the second adjuster 238 may be implemented as a geared mechanism such as a dual rack and pinion mechanism, a cog belt twisted over itself, a pulley mechanism with or without a tensioning spring, a turnbuckle mechanism or any mechanism that allows for a second separation distance between the pair of second indicator jaws 236 to be adjusted while maintaining equidistance between the pair of second indicator jaws 236 and the central opening 206.

The central portion 228*c* of the first adjuster 228 is shown in greater detail in FIG. 4. The central portion 228*c* is configured to fit within the first through-hole 223 such that the first adjuster 228 may freely rotate about the first axis of rotation, but the first adjuster 228 is inhibited from moving in the first direction D1. This relationship is shown even more clearly in FIGS. 5 and 6.

Figure 5:
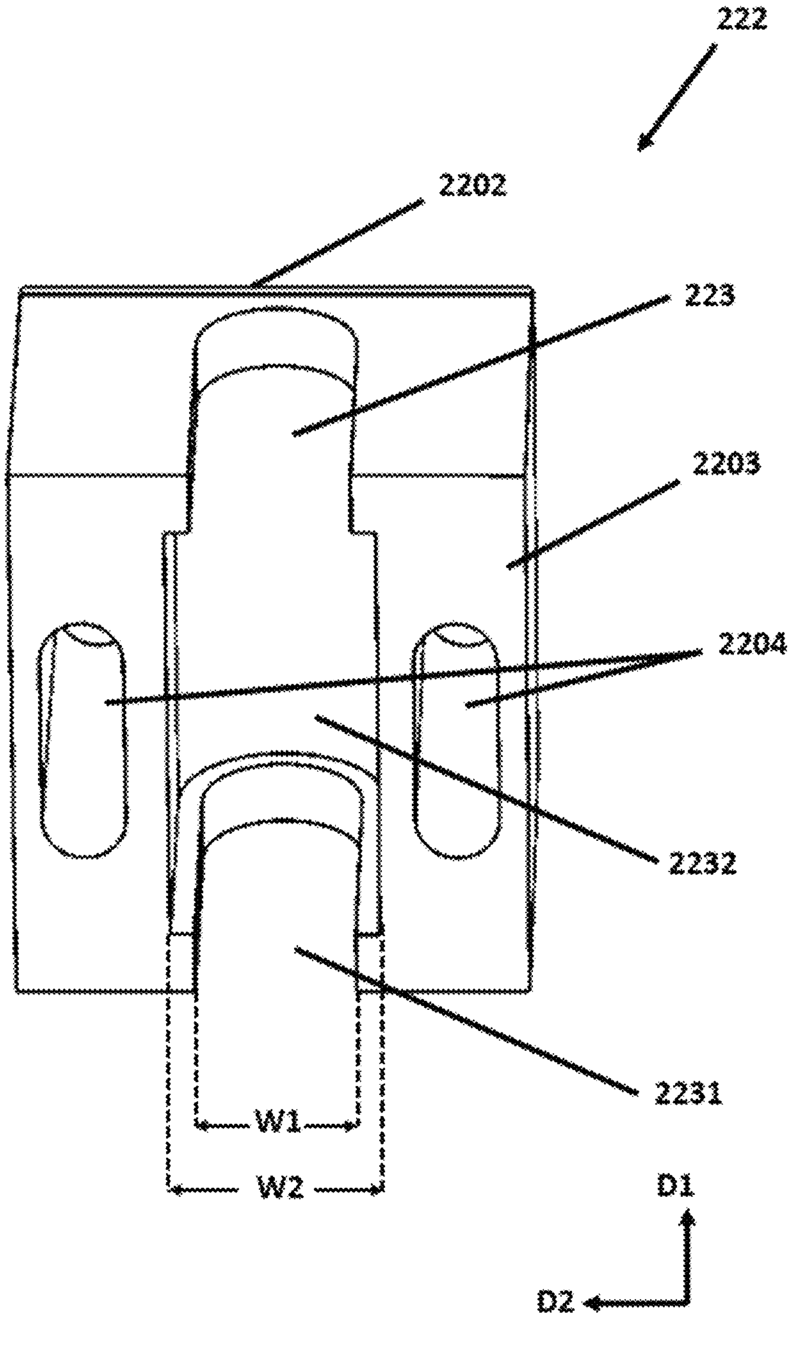
FIG. 5 shows a perspective view of a centering mechanism in accordance with an embodiment of the present invention.

FIG. 5 is a perspective view of the first centering mechanism 222. It is noted that the second centering mechanism 232 may have a similar structure, therefore discussion thereof is omitted.

As shown in FIG. 5, the first centering mechanism 222 includes a first surface 2202 and a second surface 2203 opposite the first surface 2202. The second surface 2203 faces the first surface 202 of the device body 201. The first through-hole 223 is be defined entirely through the first centering mechanism 222 along the first direction D1. In the embodiment shown in FIG. 4 the first through-hole 223 also extends through the second surface 2203, though this configuration is not limiting and is by way of example only. The first through-hole 223 may include a narrow portion 2231 at ends and a wide portion 2232 therebetween. The narrow portion 2231 may have a width W1 that is slightly greater than a width of the first ends 228*a* and the second ends 228*b* of the first adjuster 228, while the wide portion 2232 may have a width W2 that is slightly greater than a width of the central portion 228*c* of the first adjuster 228. As described above, this configuration allows the first adjuster to rotate freely about the first axis of rotation while preventing the first adjuster from moving in the first direction D1. The first centering mechanism may also include one or more receptacles 2204 for fixing the first centering mechanism 222 to the device body 201. In the present exemplary embodiment, the receptacles 2204 may be configured to receive corresponding protrusions defined in the surface of the device body 201. Alternatively, the receptacles 2204 may be configured to receive mechanical fasteners and/or an adhesive to affix the centering mechanism 222 to the device body 201.

Referring now to FIG. 6, the first adjuster 228 and the first centering mechanism 222 are shown in an exploded view. It is noted that the second adjuster 238 and the second centering mechanism 232 may have generally the same configuration. FIG. 6 is presented in the same orientation as FIG. 4, and the other elements of the center determining device 200 are omitted to more clearly illustrate how the first adjuster 228 and the first centering mechanism 222 work in concert to open and close the pair of first indicator jaws 226, while also ensuring that the pair of first indicator jaws 226 remain equidistant from the central opening 206. The central portion 228*c* of the first adjuster 228 has a width that is greater than that of the first end 228*a* and the second end 228*b* of the first adjuster 228. The first adjuster 228 fits within the first centering mechanism 222 such that the central portion 228*c* fits within the wide portion 2232 of the first through-hole 223 but cannot pass through the narrow portion 2231 of the first through-hole 223. This configuration allow the first adjuster 228 to rotate about a first axis of rotation parallel to the first direction D1 while inhibiting the first adjuster 228 from moving along the first direction D1.

Figure 7:
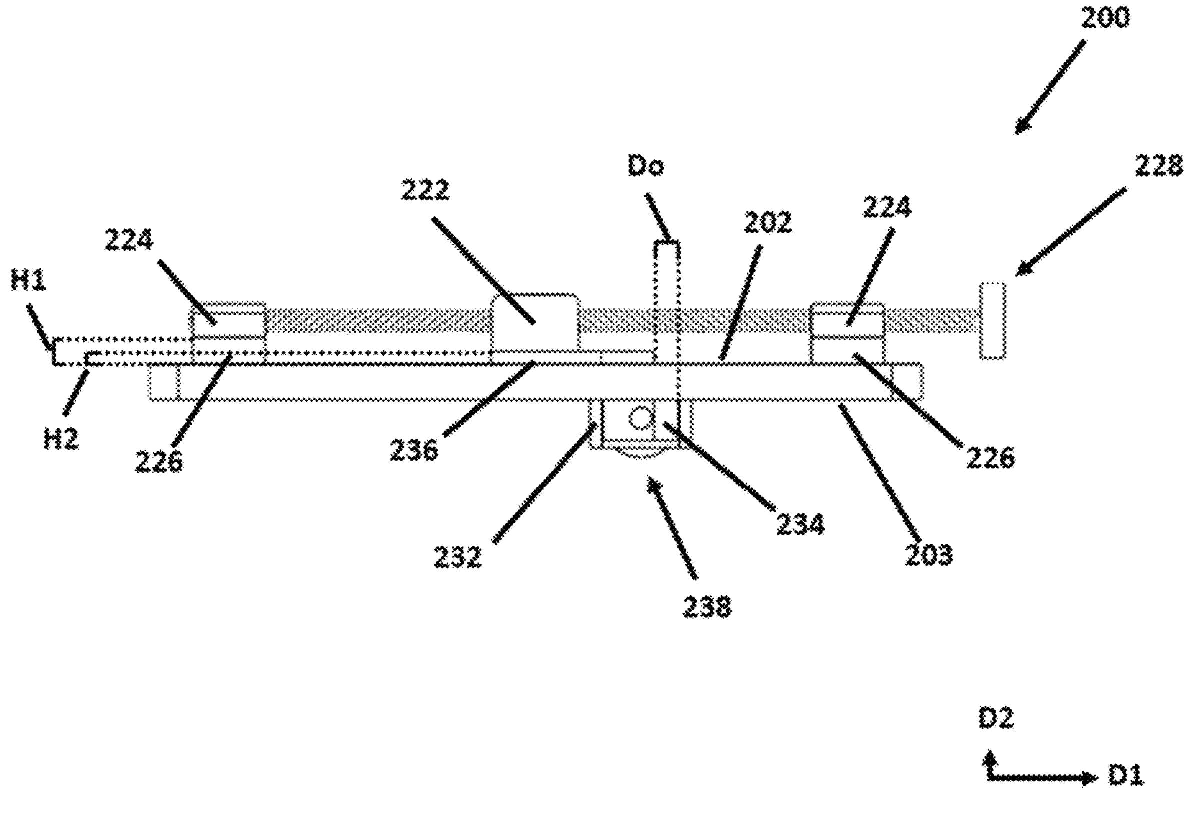
FIG. 7 shows a side view of a center determining device in accordance with an embodiment of the present invention.

Referring now to FIG. 7, a side view of the center determining device 200 is provided to illustrate additional features of the present invention. According to an embodiment of the present invention, the pair of first indicator jaws 226 may have a first height H1 that is greater than a second height H2 of the pair of second indicator jaws 236. This configuration allows for the striking face of a wood-type golf club having bulge and roll to contact both the pair of first indicator jaws 226 and the pair of second indicator jaws 236. FIG. 7 also shows that the pair of second indicator jaws 236 may be offset from an edge of the second indicator bodies 234 in the first direction D1 by an offset distance Do. The offset distance Do allows for the footprint of the center determining device 200 to be reduced by allowing the pair of first indicator jaws 226 to close over a portion of the second elongate channel 205.

Figure 8:
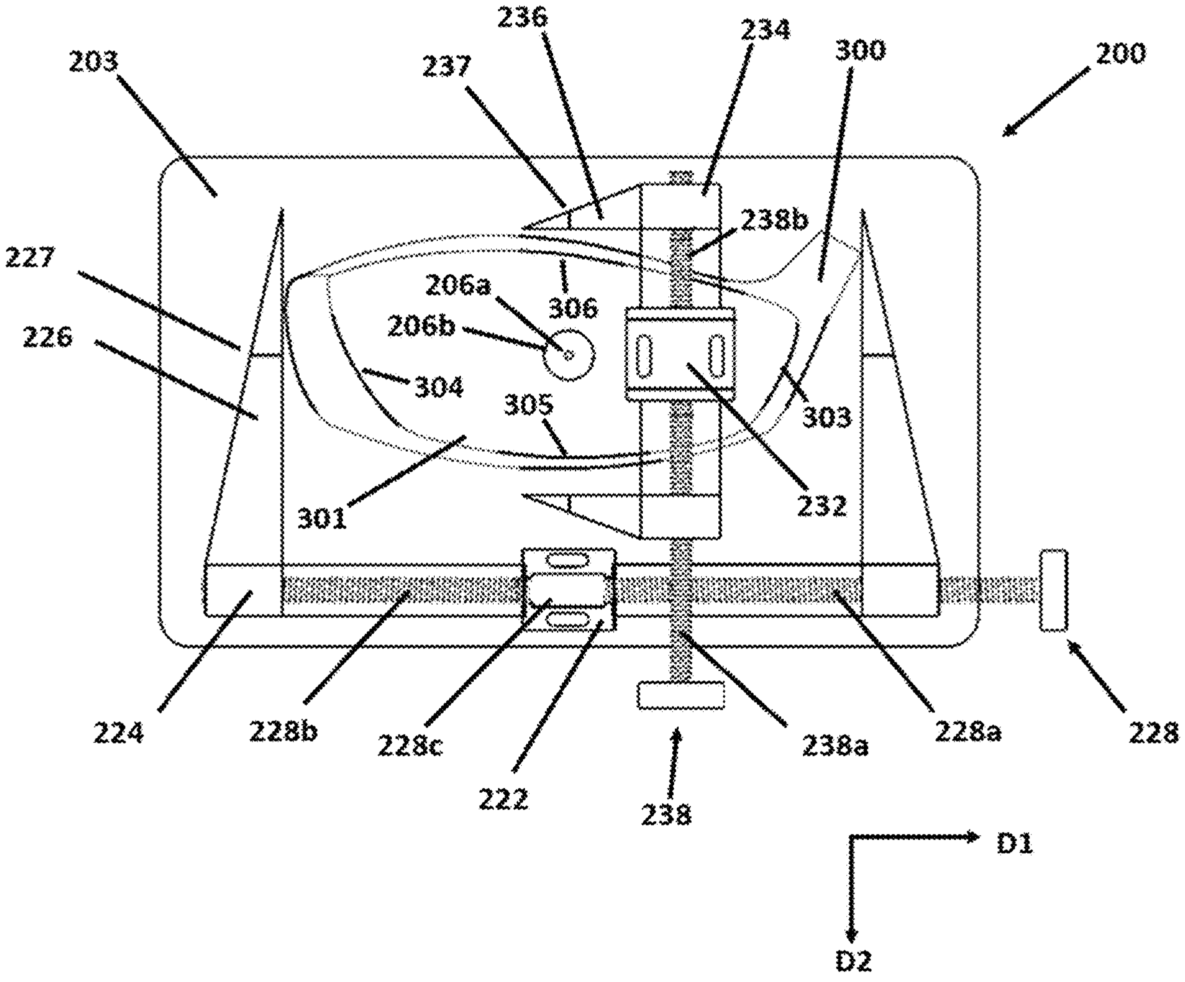
FIG. 8 shows a plan view of the center determining device in accordance with an embodiment of the present invention.
Figure 9:
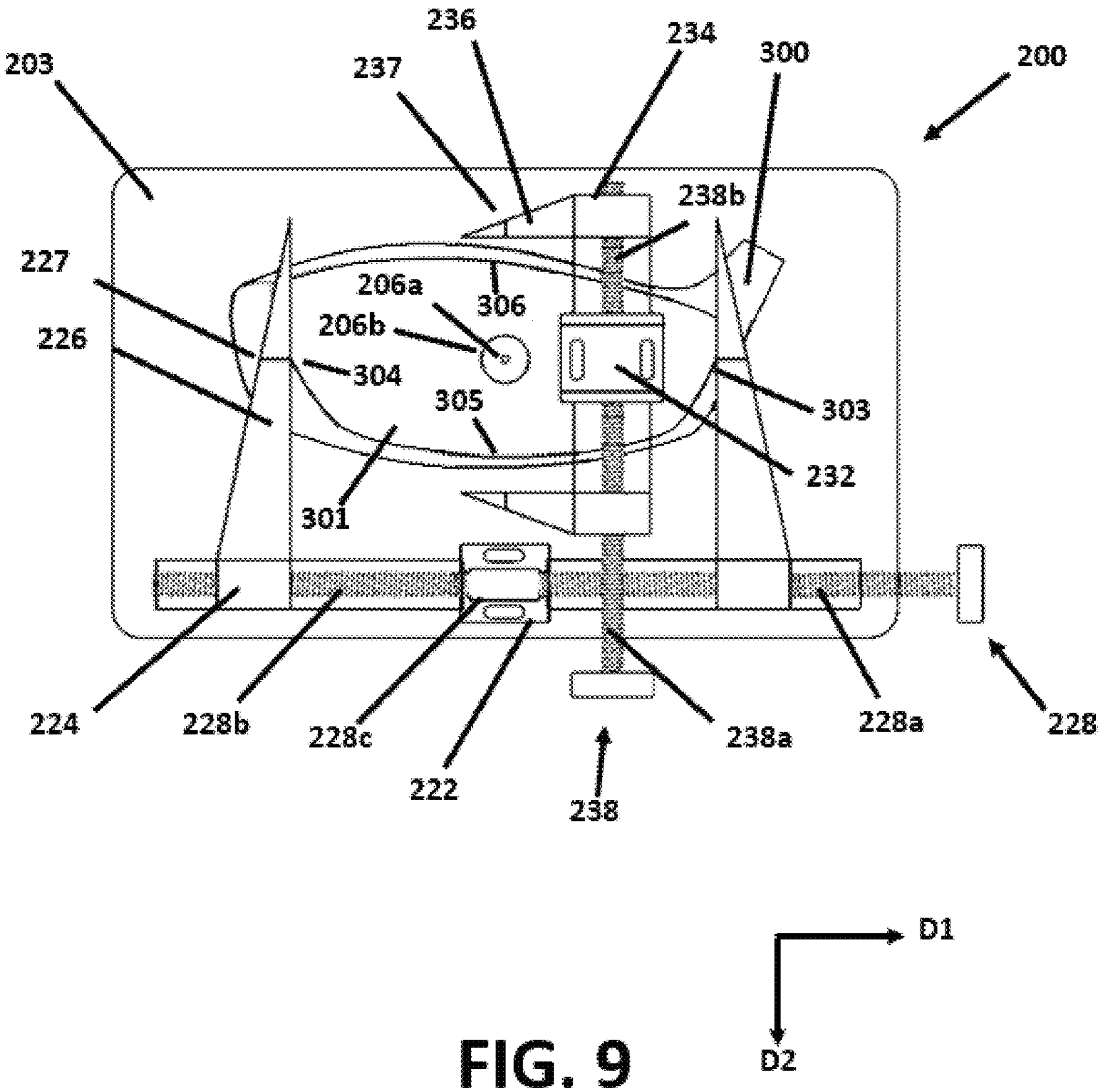
FIG. 9 shows a plan view of the center determining device with the pair of first indicator jaws adjusted to span from a heel edge to a toe edge of a striking face in accordance with an embodiment of the present invention.
Figure 10:
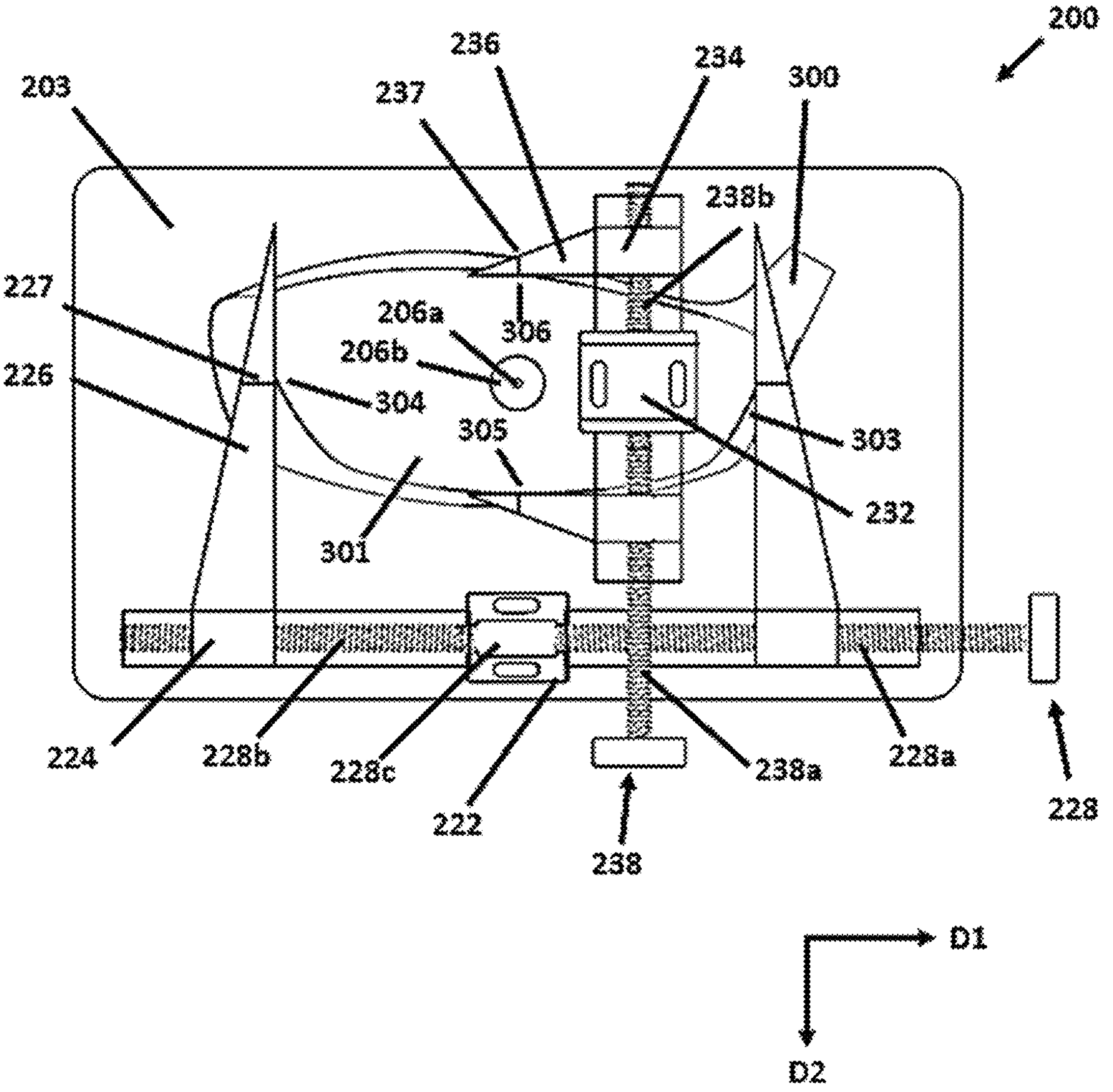
FIG. 10 shows a plan view of the center determining device with the pair of first indicator jaws adjusted to span from a heel edge to a toe edge of a striking face and the pair of second indicator jaws adjusted to span from a topline edge to a sole edge of the striking face in accordance with an embodiment of the present invention.

FIGS. 8-10 are provided to illustrate a method of determining the center of striking face using the center determining device 200.

In a step S1101, a wood-type golf club head 300 is positioned such that the striking face 301 is roughly centered about the central opening 206. FIG. 8 shows a wood-type golf club head 300 positioned such that the striking face 301 is facing the first surface 202 of the device body 201 and is roughly centered about the narrow opening 206*a* of the central opening 206. The wood-type golf club head 300 is oriented such that it is in an address position and the ground plane is parallel to the first direction D1. In contrast to the drawing figures above, in FIGS. 8-10 the device body 201 is transparent while the other elements are shown as opaque. While FIG. 8 shows that the wood-type golf club head 300 is oriented such that the pair of first indicator jaws 226 span in a width direction between the heel edge 303 and the toe edge 304 and the pair of second indicator jaws 236 span in height direction between the sole edge 305 and the topline edge 306, this is by way of example only and the present invention is not limited in this regard. While FIG. 8 shows that the pair of first indicator jaws 226 and the pair of second indicator jaws 236 are initially in a fully open position, the present invention is not limited in this regard. The pair of first of indicator jaws 226 and the pair of second indicator jaws 236 may be initially set fully open, fully closed, or anywhere in between in accordance with the present invention.

Referring now to FIG. 9, in a step S1102, the pair of first indicator jaws 226 are adjusted so as to intersect the heel edge 303 and the toe edge 304 of the striking face 301. The first adjuster 228 is rotated about the first axis of rotation such a distance between the pair of first indicator jaws 226 is adjusted until the first center indicators 227 intersect the heel edge 303 and the toe edge 304 of the striking face 301. As described above, the pair of first indicator jaws 226 always remain equidistant from the narrow opening 206*a* of the central opening 206.

Referring now to FIG. 10, in a step S1103, the pair of second indicator jaws 236 are adjusted so as to intersect the topline edge 306 and the sole edge 305 of the striking face 301. The second adjuster 238 is rotated about the second axis of rotation such a distance between the pair of second indicator jaws 236 is adjusted until the second center indicators 237 intersect the topline edge 306 and the sole edge 305 of the striking face 301. As described above, the pair of second indicator jaws 236 always remain equidistant from the narrow opening 206*a* of the central opening 206.

In a step S1104 steps S1103 and S1104 are repeated to ensure that both the pair of first indicator jaws 226 and the pair of second indicator jaws 238 precisely intersect the heel edge 303, the toe edge 304, the topline edge 306, and the sole edge 305 of the striking face 301, respectively. It may be necessary to also slightly adjust the position of the wood-type golf club head 300 during steps S1102-S1104. It is noted that step S1102 may be performed before or after step S1103 in accordance with the present invention.

In a step S1105, a marker (not shown) is inserted through the central opening 206 such that a tip of the marker passes through the narrow opening 206*a* of the central opening 206 and marks the center of the striking face 301.

In a step S1106, the pair of first indicator jaws 226 and the pair of second indicator jaws 236 are adjusted so as to not contact the striking face 301 and the wood-type golf club head 300 is balanced on the projection 206*p*. In this configuration, the center determining device 200 may identify the location of the projection of the center of gravity of the wood-type golf club head 300 on the striking face 301. In detail, the wood-type golf club head 300 may be balanced with the striking face 301 contacting only the projection 206*p*. When the wood-type golf club head 300 is balanced on the projection 206*p*, the marker may be used to mark the projected center of gravity of the wood-type golf club head 300 on the striking face 301 through the central opening 206 as described in step S1105. The smaller the surface area of the projection 206*p*, the more accurately the projection of the center of gravity of the wood-type golf club head 300 on the striking face 301 may be identified.

Figure 11:
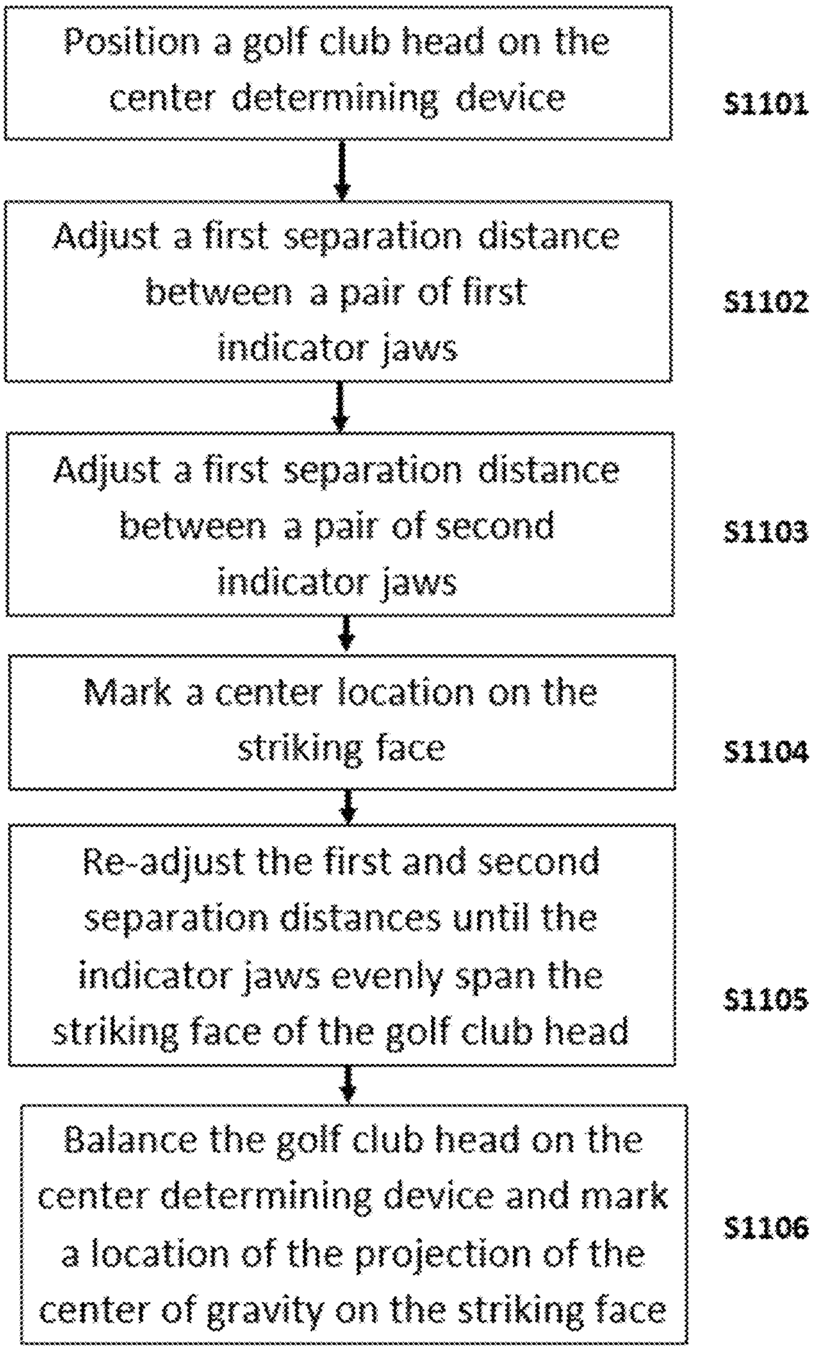
FIG. 11 is a flowchart illustrating a method of identifying the center of a striking face in accordance with an embodiment of the present invention.

FIG. 11 is a flowchart illustrating a method of determining the center of striking face according to an exemplary embodiment of the present invention as described above. The method includes positioning a golf club head on a center determining device in a step S1101, adjusting a first separation distance between a pair of first indicator jaws in a step S1102, adjusting a second separation distance between a pair of second indicator jaws in a step S1103, re-adjusting the first and second separation distances until the pair of first indicator jaws and the pair of second indicator jaws evenly span the striking face of the golf club head in a step S1104, marking the center location of the striking face in a step S1105, and balancing the golf club head on the projection and marking a projection of the center of gravity of the golf club head on the striking face in a step 1106.

Figure 12:
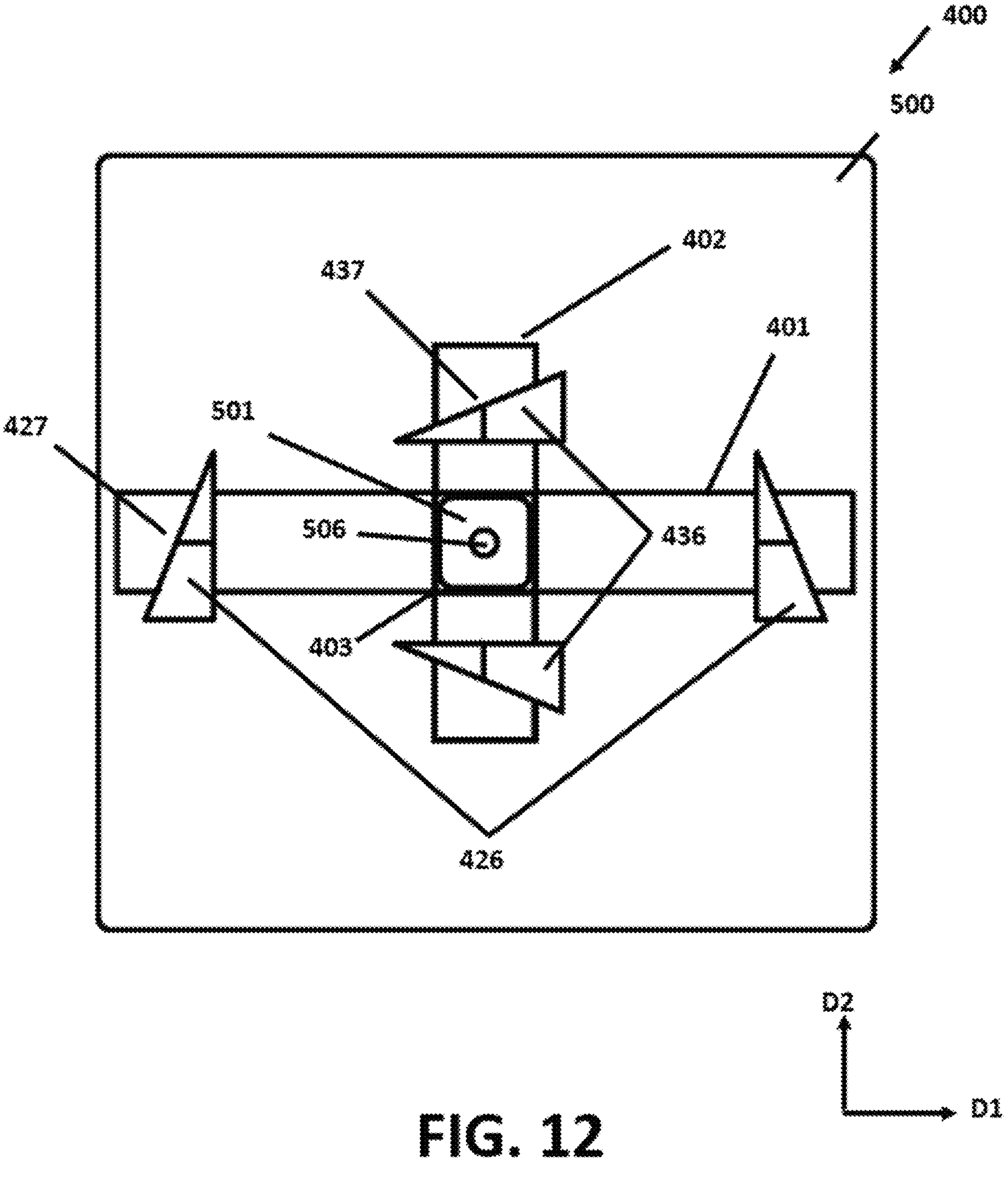
FIG. 12 is a plan view of a center determining device in accordance with another embodiment of the present invention.
Figure 13:
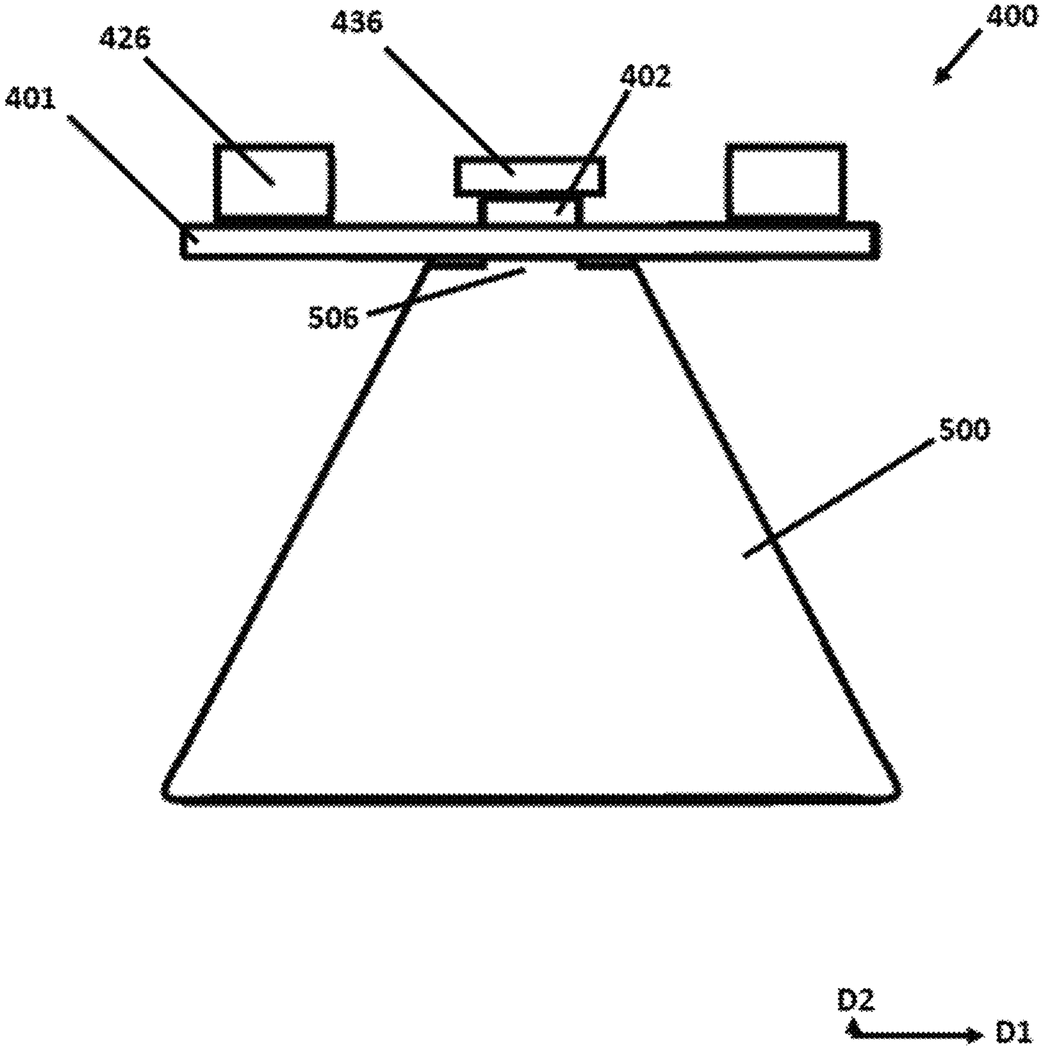
FIG. 13 is a side view of a center determining device in accordance with another embodiment of the present invention.

FIGS. 12 and 13 show a center determining device 400 according to another embodiment of the present invention. The center determining device 400 is similar to the center determining device 200 therefore the following description will focus on the unique features of center determining device 400.

As shown in FIG. 12, a pair of first indicator jaws 426 are adjustably mounted on a first frame member 401 and a pair of second indicator jaws 436 are adjustably mounted on a second frame member 402. The first frame member 401 and the second frame member 402 support the pair of first indicator jaws 426 and the pair of second indicator jaws 436 in much the same way as the device body 201 supports the pair of first indicator jaws 226 and the pair of second indicator jaws 236. The pair of first indicator jaws 426 include first center indicators 427 and are configured to move in the first direction D1 along the first frame member 401.

The second frame member 402 may be oriented such that it is substantially orthogonal to the first frame member 401 and may be attached to the first frame member 401, and collectively the first frame member 401 and the second frame member 402 define a frame opening 403. The pair of second indicator jaws 436 include second center indicators 437 and are configured to move in the second direction D2 along the second frame member 402.

In this exemplary embodiment a first centering mechanism and a second centering mechanism (not shown) may be located within the first frame member 401 and the second frame member 402, respectively. The centering mechanisms may include a tie rod mechanism, a turnbuckle mechanism, a cog belt twisted over itself, a pulley mechanism with or without a tensioning spring, or a dual rack and pinion mechanism that is configured to maintain equidistance between a central opening 506 and the pair of first indicator jaws 426 and the pair and maintain equidistance between the central opening 506 and the pair of second indicator jaws 436.

The center determining device 400 may include a base member 500. Base member 500 may include an upper protrusion 501 that nests within the frame opening 403 as shown in FIG. 11. The central opening 506 may be defined in the upper protrusion 501. A marker (not shown) may be positioned within the base member 500 such that the tip of the marker protrudes through the central opening 506 and may be used to mark a center location on a wood-type golf club head (not shown). It is noted that it is within the scope of the present invention that center determining device 200 may include a base member 500.

According to an embodiment, the base member 500 may be separated from the other components of the center determining device 400 and used to identify the location of the projection of the center of gravity of a golf club head on its striking face. In detail, a golf club head may be balanced with the striking face contacting the upper protrusion 501. When the golf club is balanced on the upper protrusion 501 the marker may be used to mark the projected center of gravity of the golf club head on the striking face through the central opening 506. The smaller the surface area of the upper protrusion 501, the more accurately the projection of the center of gravity of the golf club may be identified. Alternatively, the upper protrusion 501 may extend through the frame opening 403 such that a wood-type golf club head could be balanced on the protrusion 501 in a manner similar to protrusion 206*p* above.

FIG. 13 shows the center determining device 400 from the side. The upper protrusion 501 extends upward from the base member 500 and into the frame opening 403. The pair of first indicator jaws 426 and the pair of second indicator jaws 436 may have different heights to account for bulge and roll as described above with regard to center determining device 200.

Figure 14:
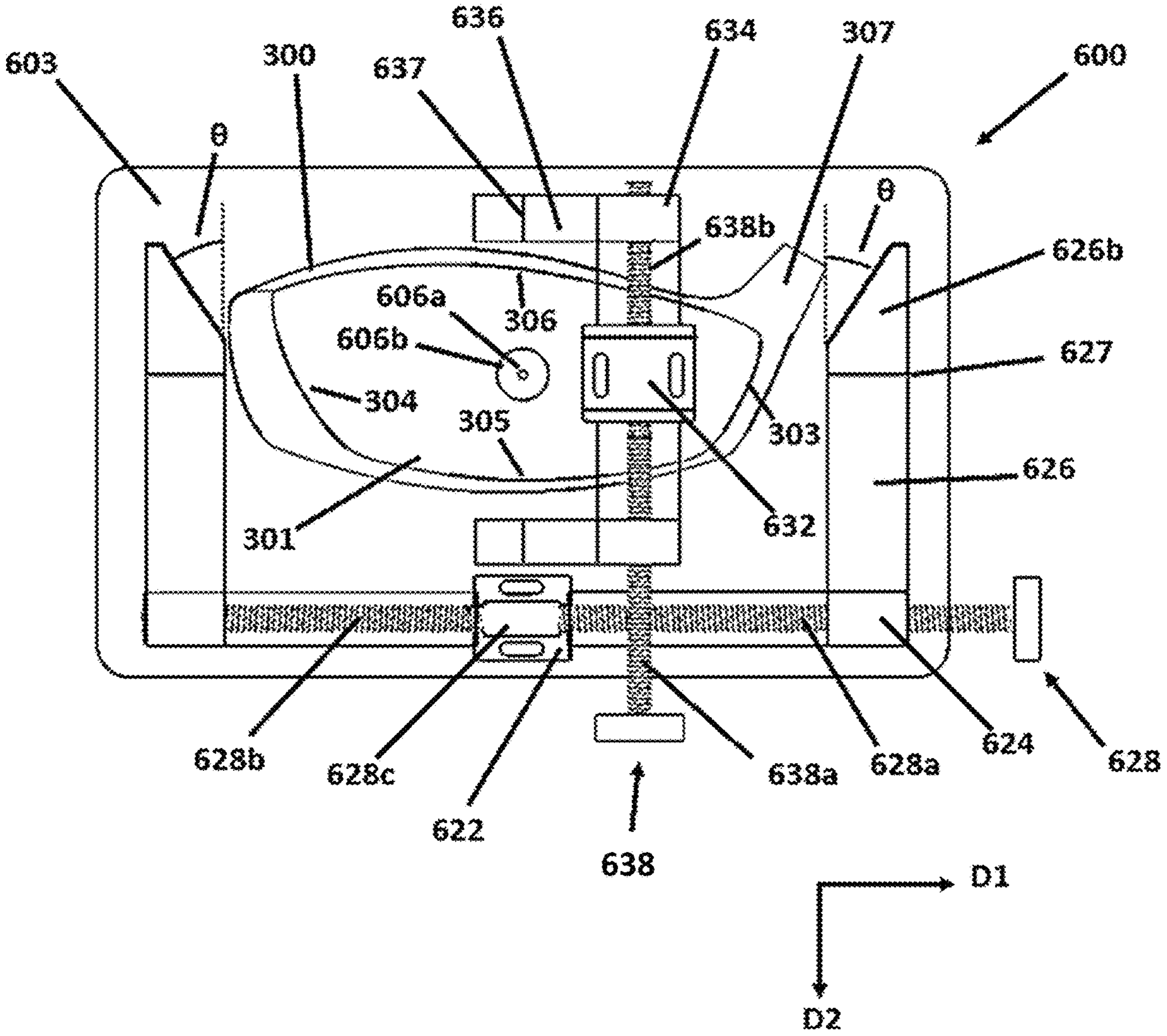
FIG. 14 is a plan view of a center determining device in accordance with yet another embodiment of the present invention.

FIG. 14 shows a center determining device 600 in accordance with yet another embodiment of the present invention. Center determining device 600 is similar to center determining device 200, but includes a few key differences. Like elements include like reference numbers, and discussion of like elements is omitted.

Center determining device 600 is shown with a wood-type golf club head 300 positioned such that the striking face 301 is roughly centered the narrow opening 606*a*. According to an exemplary embodiment as illustrated in FIG. 14, the pair of first indicator jaws 626 include an additional novel feature.

The wood-type golf club head 300 includes a hosel 307. It is common for the hosel 307 to be onset or offset relative to the striking face 301 in various designs for wood-type golf club heads. As shown in FIG. 14, the pair of first indicator jaws 626 include a hosel relief portion 626*b*. The hosel relief portion 626*b* is defined at an ends of the pair of first indicator jaws 626 furthest from the pair of first indicator bodies 624 beyond the first center indicator 627. An edge of the hosel relief portion 626*b* nearest the central narrow opening 606*a* is defined at an angle θ relative to the second direction. The angle θ may be roughly equal to a lie angle of the wood-type golf club head 300.

According to an exemplary embodiment of the present invention, the angle θ may be in the range of about 27° to about 36°, more preferably in the range of about 30° to about 34°, and most preferably about 32°. The hosel relief portion 626*b* is configured such that each of the pair of first indicator jaws 626 and the pair of second indicator jaws 636 contact the striking face 301 even in a case where the hosel 307 is onset from the striking face 301.

In describing the present technology herein, certain features that are described in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure as well as the principle and novel features disclosed herein.

What is claimed is:

1. A device for identifying a center of a striking face of a golf club head, comprising:

- a body having first surface and second surface opposite the first surface, wherein the body is at least partially transparent;
- a central opening defined through the first surface and the second surface;
- a first dimension indicator positioned on the body, the first dimension indicator comprising:
  - a first centering mechanism attached to the first surface and spaced apart from the central opening, the first centering mechanism having a first through-hole,
  - a pair of first indicator bodies disposed at least partially within the body, each of the pair of first indicator bodies having a threaded opening defined therein extending in a first direction;

a pair of first indicator jaws attached to the pair of first indicator bodies and extending along the first surface of the body in a second direction at least as far as the central opening, a first threaded adjuster mated with the threaded openings of the pair of first indicator bodies and passing through the first through-hole defined in the first centering mechanism, wherein the first threaded adjuster is configured to adjustably increase and decrease a first separation distance between the pair of first indicator jaws while maintaining equidistance between the pair of first indicator jaws and the central opening;

a second dimension indicator positioned on the body, the second dimension indicator comprising:

a second centering mechanism attached to the second surface and spaced apart from the central opening along the second direction, a pair of second indicator bodies disposed at least partially within the body;

a pair of second indicator jaws attached to the pair of second indicator bodies and extending along the first surface in the first direction at least as far as the central opening, a second threaded adjuster mated with the threaded openings of the pair of second indicator bodies and passing through a second through-hole defined in the second centering mechanism, wherein the second threaded adjuster is configured to increase and decrease a second separation distance between the pair of second indicator jaws while maintaining equidistance between the pair of second indicator jaws and the central opening, wherein the device is adapted to engage the striking face, aligning the central opening with the center of the striking face when the pair of first indicator jaws are aligned with a heel edge and a toe edge of the striking face and the pair of second indicator jaws are aligned with a topline edge and a sole edge of the striking face.

2. The device of claim 1, wherein the central opening is configured to accommodate a marker to mark the center of the striking face, wherein the central opening comprises a wide opening defined in the second surface of the body through a partial thickness of the body and a narrow opening defined in the first surface of the body through an entire thickness of the body.

3. The device of claim 1, wherein a portion of the body proximate the central opening extends above the first surface of the body and defines a protrusion, and wherein the device is adapted to engage the golf club head such that a point of contact between the golf club head and the device occurs only at the protrusion and the striking face, aligning a projection of a center of gravity of the golf club head on the striking face with the central opening.

4. The device of claim 1, wherein the device further comprises a first elongate channel extending in the first direction adjacent an edge of the body and defined through the first surface of the body, wherein the first dimension indicator is positioned along the first elongate channel, wherein the first centering mechanism is proximate to the first elongate channel, wherein the pair of first indicator bodies disposed at least partially within the first elongate channel, wherein the first through-hole is defined therethrough and is substantially parallel to the first elongate channel, wherein a width of the first through-hole is greater in a central portion of the first through-hole than at ends of the first through-hole, and wherein the first threaded adjuster comprises a first end having first threads, a second end opposite the first end having second threads which are opposite the first threads, and a central portion of the first threaded adjuster between the first end and the second end having a width greater than the width of the first through-hole at the ends of the first through-hole and less than the width of the central portion of the first through-hole.

5. The device of claim 4, wherein the pair of first indicator jaws are spaced apart by the first separation distance such that the central opening is located at a midpoint of the first separation distance.

6. The device of claim 1, wherein the device further comprises a second elongate channel extending in the second direction adjacent the central opening and defined through the first surface of the body and the second surface of the body, wherein the second dimension indicator is positioned along the second elongate channel, wherein the second centering mechanism is proximate to the second elongate channel, wherein the pair of second indicator bodies disposed at least partially within the second elongate channel, wherein the second through-hole is defined therethrough that is substantially parallel to the first elongate channel, wherein a width of the second through-hole is greater in a central portion of the second through-hole than at ends of the second through-hole, and wherein the second threaded adjuster comprises a first end having first threads, a second end opposite the first end having second threads which are opposite the first threads, and a central portion between the first end and the second end having a width greater than the width of the first through-hole at the ends of the first through-hole and less than the width of the central portion of the first through-hole.

7. The device of claim 6, wherein the pair of first indicator jaws are spaced apart by the first separation distance such that the central opening is located at a midpoint of the first separation distance.

8. The device of claim 1, wherein the first threaded adjuster is rotatable about a first axis of rotation so that the pair of first indicator bodies are forced to translate in opposite directions along a first axis of translation extending in the first direction.

9. The device of claim 8, wherein the second threaded adjuster is rotatable about a second axis of rotation so that the pair of second indicator bodies are forced to translate in opposite directions along a second axis of translation extending in the second direction.

10. The device of claim 8, wherein a central portion of the first threaded adjuster is configured to fit within the first through-hole such that the first threaded adjuster freely rotates about the first axis of rotation, and wherein the first threaded adjuster is inhibited from moving in the first direction.

* * * * *